Aug. 23, 1938.  W. K. WALKER  2,128,215

DEPTH GAUGE

Filed March 21, 1936

INVENTOR.
William K. Walker
BY
his ATTORNEY.

Patented Aug. 23, 1938

2,128,215

UNITED STATES PATENT OFFICE 2,128,215

DEPTH GAUGE

William K. Walker, New York, N. Y., assignor to American Radiator Company, New York, N. Y., a corporation of New Jersey Application March 21, 1936, Serial No. 70,138

9 Claims. (Cl. 33—169)

My invention relates to improvements in means for measuring the depth of openings or the extent of opening of variable orifices, and the same has for its object to provide a simple, efficient, and accurate device which is capable of indicating upon a readily observable scale relatively slight variations in the dimension being measured.

Further, said invention has for its object to provide a device of the character specified in which the measuring means thereof is capable of determining the extent of opening of a metering orifice for supplying operating fluid to a heat exchanger and of indicating upon a suitable scale the estimated flow through said orifice expressed in square feet of radiating surface.

Further, said invention has for its object to provide a device of the character specified in which the measuring means thereof includes means for indicating the measurements upon a scale disposed transversely of the direction of movement of said measuring means so that the readings relative to the dimensions measured may be magnified or enlarged.

Other objects will in part be obvious and in part be pointed out hereinafter.

In the accompanying drawing, Figure 1 is a plan view of one form of device constructed in accordance with and embodying my said invention, the same being disposed in position for measuring the length of the orifice in a steam valve shown in part in section;

The measuring device 10 embodying the present invention, although not limited in use, is particularly adapted for indicating the extent of opening of the metering orifice 11 of the steam valve 12 for supplying steam or other operating fluid to a radiator or heat exchanger.

Figure 1:
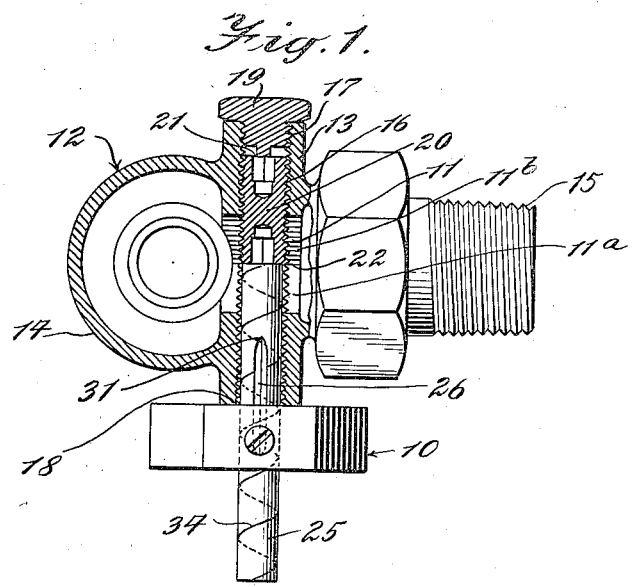
Figure 2:
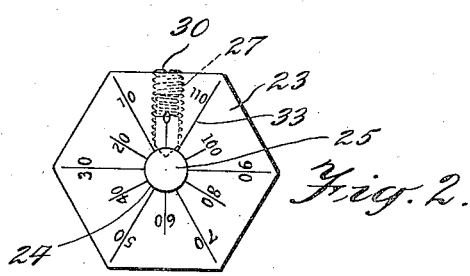
Fig. 2 is a front elevation of the device.
Figure 3:
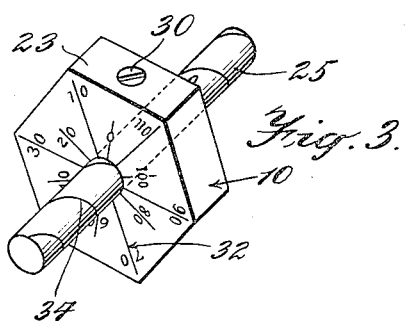
Fig. 3 is a perspective thereof.
Figure 4:
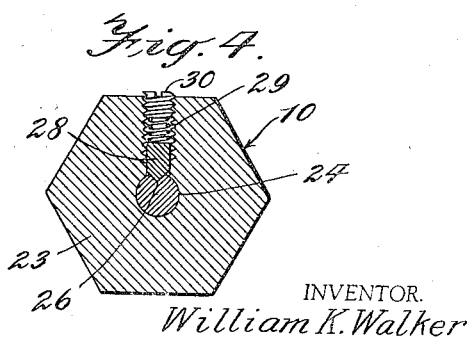
Fig. 4 is a transverse section thereof.

The particular valve 12 shown in Fig. 1 is of the type disclosed and claimed in the copending application of William Walter Timmis and myself, filed December 3, 1935, Serial No. 52,650, and includes a tubular portion 13 disposed between the body 14 of the valve and the outlet connection 15. The tubular portion 13 is internally threaded throughout the length thereof, as indicated at 16. The open ends 17 and 18 are hermetically closed by the threaded closures or plugs 19 which constitute gauge stops for the traveler or orifice adjusting means 20. The traveler 20 is preferably in the form of a cylindrical plug and is screw-threaded throughout its length for engagement with the threads 16. The traveler 20 controls the effective area of the centrally located port or orifice 11 to allow measured quantities of steam to pass therethrough.

The orifice 11 consists of two duplicate halves or parts 11$^a$—11$^b$, each capable when fully open of allowing maximum flow therethrough. The traveler 20 has a length substantially equal to the distance between the inner end 21 of the plug 19 and the medial line 22 of the orifice 11. In the position of the traveler 20 shown, the portion 11$^a$ of the orifice is fully open. When it is desired to reduce the area of the orifice 11$^a$, the traveler 20 is rotated or backed away from the stop 21 the desired number of turns by the insertion of a suitable tool through the open end 18.

As more fully disclosed in said copending application, the orifice portions 11$^a$—11$^b$ are each shaped so that for a given pressure differential across the valve 12 equal axial movements of the traveler 20 cause equal changes in the flow of steam.

The flow is expressed in square feet of radiating surface of the heat exchanger supplied with the steam, each square foot condensing about a quarter of a pound of steam per hour. Each turn of the screw 20 produces approximately the same change in the rate of flow of steam so that the flow rate varies substantially as a straight line function of the axial movement of the traveler 20. It therefore follows that the variation in length of the orifice part 11$^a$ produces a straight line variation in flow, so that by measuring the effective length of the orifice 11$^a$ at any adjustment of the traveler 20, it is possible to determine the flow directly in square feet of radiating surface of the heat exchanger.

The device 10 for measuring the depth of the opening in the tubular portion 13 of the steam valve, and in the particular instance the flow of steam in square feet of radiating surface, comprises a body or abutment member 23, shown as hexagonal in shape, having a central, circular opening 24 therethrough in which the cylindrical measuring plunger 25 slides. The surface of the plunger 25 is provided with a longitudinal groove 26. The member 23 above said groove 26 has an opening 27 therein extending into the axial opening 24. A key member 28 is located in the opening 27 and extends into the groove 26. The key member 28 is retained yieldably in the groove 26 by a spring 29 within the opening 27 and retained therein by the closure plug 30. The key member 28 serves to prevent relative rotation between the parts 23 and 25, and the ends 31 of the groove 26, by engagement with the key member 28, limit the movement of the plunger 25 in both directions.

The transverse face of the member 23 forms a dial provided with a radial scale 32, preferably comprising the lines 33 forming graduations or scale marks and extending outwardly radially from and about the circular opening 24 in the member 23, said radial lines having a common center coincident with the axis of the plunger 25, and forming with each other equal angles. The scale 32 serves to indicate the flow through the orifice 11 of the steam valve directly in terms of square feet of radiating surface, and the marks 33 are numbered successively from 0 to 110, the successive graduations indicating, in the example shown, variations of ten square feet of radiating surface per turn of the traveler 20.

The particular steam valve 12 illustrated has an orifice 11 designed to control the flow to radiators having a radiating surface of an area varying from a few square feet up to one hundred and ten square feet, and the orifice 11 is so designed that at a given pressure across the valve, say, one pound pressure, for each turn of the traveler 20, the flow varies approximately ten square feet of radiating surface. In practice, the variation in the length of the orifice produced by one turn of the screw to vary the flow ten square feet of radiating surface, is very slight. In fact, one form of orifice employed in practice had a length in the direction of screw travel of about .375 inch, and eleven turns of the screw traveler 20 adjusted the orifice area over its entire range.

In order that the slight differences in the axial dimension or length of the orifice 11 may be readily measured and observed, the scale 32 is disposed transversely of the direction of movement of the plunger 25, and the spacing between the graduations 33 are enlarged or magnified relative to the movement per turn of the traveler 20. Pointing or indicating means 34 upon the plunger 25 cooperate with the scale 32 to register with the successive graduations 33 as the plunger 25 is varied in position relative to the dial member 23. The means 34 preferably comprises a helical line or mark extending about the plunger 25 and having a pitch coordinated with the travel of the plunger 25 relative to the dial member 23 and with the angular spacing between the graduations 33, which, in the example shown, is 30 degrees. The coordination is such that the measurements of the orifice dimension made by adjustment of the plunger relative to the dial member 23 causes the helix 34 to register at successive points thereon with the graduation corresponding to the measurement, and indicating the same.

In operation, the device 10 is placed in position with the dial member 23 in engagement with the end of the tubular passage 13 and with the plunger 25 extending into the opening. The plunger is then pushed inwardly until the end thereof engages the traveler 20. The helical mark 34 then registers at some point thereof with the graduation 33 indicating the flow of steam corresponding to the orifice opening.

By my invention slight variations in the position of the plunger 25 relative to the dial member 23 in measuring the depth of openings or dimensions of metering or other orifices are magnified to give readings on a relatively enlarged scale 32, so that the readings may be readily observed. The scale may be calibrated or graduated to give the readings directly in units of measurement or in terms of some other unit constituting a function of said measurement, such as the flow of steam through an orifice expressed in square feet of radiating surface.

What I claim and desire to secure by Letters Patent of the United States is:

1. A device of the character described, comprising an abutment member having faces at the opposite sides thereof, a measuring plunger slidable axially therethrough transversely of said faces, a scale upon one of said transverse faces including graduations extending outwardly radially from said plunger in spaced apart relation, and means on said plunger extending therealong in angular relation to the axis thereof and registering with the radial graduations successively upon relatively slight increments of movement of said plunger.

2. A device of the character described, comprising an abutment member having faces at the opposite sides thereof, a measuring plunger slidable axially therethrough transversely of said faces, said plunger projecting beyond one face of said abutment member and cooperating therewith for gauging the depth of an opening, a scale upon the opposite faces of said abutment member including graduations extending outwardly radially from said plunger and indicating the readings for the entire depth measuring range of the device, and means on said plunger extending axially and angularly thereof at a pitch substantially equal to said measuring range for registration with the radial graduations successively.

3. A device of the character described, comprising an abutment member having radially extending graduations forming a scale upon the face thereof, and a measuring plunger slidably disposed centrally within said member and having helically arranged indicating means thereon to register at successive points thereof with the graduations of said scale upon movement of said plunger relative to said member.

4. A device of the character described, comprising a dial member constituting an abutment and having a central opening therein, graduation marks extending radially outwardly from said opening and disposed about the same, and a measuring plunger sliding in said opening and having a helically arranged indicating means thereon capable of registering at successive points thereof with said graduations.

5. A device of the character described, comprising a member having a circular opening centrally thereof, graduation marks upon the face of said member extending radially from and about said opening, and a cylindrical plunger slidable in said opening and retained against rotation therein, and a helical line on said plunger having a pitch allowing registration thereof with successive graduations upon relatively slight increments of movement of said plunger.

6. A device of the character described, comprising an abutment member having radially extending graduations forming a scale upon one face thereof graduated to give readings of a flow of operating fluid in square feet of radiating surface, and a plunger slidable axially through said abutment member and projecting beyond the other face thereof for measuring a dimension of a metering orifice for supplying operating fluid to a heat exchanger in accordance with the area thereof, and means on said plunger having a pitch relative to the axis thereof substantially equal to the measuring range of the device for registration with the successive graduations of the scale.

7. A device of the character described, comprising an abutment member forming a dial and having radially extending graduations forming a scale on the face thereof calibrated to give readings of a flow of operating fluid in square feet of radiating surface, a plunger slidably mounted in said member for measuring a dimension of a metering orifice for supplying operating fluid to a heat exchanger in accordance with the radiating surface thereof, and means extending helically about said plunger at a pitch for causing registration thereof at successive points with said graduations for indicating the measurements.

8. A device of the character described, comprising an abutment member having a scale upon a face thereof including graduations extending radially outwardly from about the axis thereof, a cylindrical plunger slidable axially through said member and projecting beyond the opposite face thereof for measuring the depth of an opening, and a helical marking on said plunger comprising a turn having a pitch substantially equal to the entire measuring range of the device and registering with the successive graduations of the scale upon relatively slight increments of movement of the plunger.

9. A device of the character described, comprising an abutment member having a circular opening centrally thereof, scale graduations upon one face of said member extending radially outwardly from and about said opening, a cylindrical measuring plunger slidably disposed within said opening and projecting beyond the opposite face of said member for measuring the depth of an opening, a helical marking on said plunger comprising a turn having a pitch substantially equal to the measuring range of the device and registering with the successive graduations of said scale upon movement of said plunger over said range, said plunger having a longitudinally extending groove therein providing stops at the ends thereof spaced inwardly from the ends of the plunger, and a spring-pressed key on said abutment member in engagement with said groove to prevent rotation of said plunger and retain the same within said abutment member with said helical turn in operative relation to said scale.

WILLIAM K. WALKER.